United States Patent
Shah et al.

(10) Patent No.: US 12,153,575 B2
(45) Date of Patent: Nov. 26, 2024

(54) DATABASE QUERY SPLITTING

(71) Applicant: ServiceNow, Inc., Santa Clara, CA (US)

(72) Inventors: Siddharth Shah, Kirkland, WA (US); Souvik Bhattacherjee, Santa Clara, CA (US); Josef Mart, San Francisco, CA (US)

(73) Assignee: ServiceNow, Inc., Santa Clara, CA (US)

( * ) Notice: Subject to any disclaimer, the term of this patent is extended or adjusted under 35 U.S.C. 154(b) by 21 days.

(21) Appl. No.: 17/470,422

(22) Filed: Sep. 9, 2021

(65) Prior Publication Data

US 2023/0072930 A1    Mar. 9, 2023

(51) Int. Cl.
*G06F 16/2453* (2019.01)
*G06F 11/34* (2006.01)
*G06F 16/242* (2019.01)

(52) U.S. Cl.
CPC .... *G06F 16/24532* (2019.01); *G06F 11/3419* (2013.01); *G06F 16/244* (2019.01); *G06F 16/24544* (2019.01); *G06F 16/24545* (2019.01)

(58) Field of Classification Search
CPC .......... G06F 16/24532; G06F 11/3419; G06F 16/244; G06F 16/24544; G06F 16/24545; G06F 16/24534; G06F 16/221; G06F 16/2282
See application file for complete search history.

(56) References Cited

U.S. PATENT DOCUMENTS

| | | | |
|---|---|---|---|
| 10,162,729 B1 * | 12/2018 | Snyder | G06F 40/205 |
| 10,929,415 B1 * | 2/2021 | Shcherbakov | G06F 3/04842 |
| 2003/0212701 A1 * | 11/2003 | Beavin | G06F 16/24544 |
| | | | 707/999.102 |
| 2005/0283465 A1 * | 12/2005 | Dettinger | G06F 16/2452 |
| 2008/0281784 A1 * | 11/2008 | Zane | G06F 16/24557 |

(Continued)

OTHER PUBLICATIONS

Mohamad, Baraa, Laurent d'Orazio, and Le Gruenwald. "Towards a hybrid row-column database for a cloud-based medical data management system." (2012) Proceedings of the 1st International Workshop on Cloud Intelligence. (Year: 2012).*

(Continued)

*Primary Examiner* — Vaishali Shah
(74) *Attorney, Agent, or Firm* — Van Pelt, Yi & James LLP

(57) ABSTRACT

A determination is made whether a received database query is to be processed by either a first database, a second database, or at least in part by both the first and second databases including by determining whether the query meets criteria to split the query for processing across the first and second databases. The first and second databases store shared synchronized records, the first database configured to store the records in a column-oriented format and the second database configured to store the records in a row-oriented format. In response to a determination that the query meets the criteria to split the query, a first and second component query of the database query are generated for the first and second databases, respectively, the second component query based at least in part on a result of the first component query. The execution of the first and second component queries is pipelined.

20 Claims, 7 Drawing Sheets

(56) References Cited

U.S. PATENT DOCUMENTS

| | | | | |
|---|---|---|---|---|
| 2013/0198168 A1* | 8/2013 | Huang | ............... | G06F 16/24542 |
| | | | | 707/769 |
| 2013/0239093 A1* | 9/2013 | Nori | .................... | G06F 9/44589 |
| | | | | 717/126 |
| 2014/0244628 A1* | 8/2014 | Yoon | .................... | G06F 16/2365 |
| | | | | 707/722 |
| 2015/0169686 A1* | 6/2015 | Elias | ................. | G06F 16/24542 |
| | | | | 707/718 |
| 2016/0210328 A1* | 7/2016 | Bendel | ............... | G06F 16/24544 |
| 2016/0306849 A1* | 10/2016 | Curino | ............... | G06F 16/24535 |
| 2016/0335306 A1* | 11/2016 | Teodorescu | ......... | G06F 11/1469 |
| 2018/0046643 A1* | 2/2018 | Brodt | .................... | G06F 16/178 |
| 2019/0347261 A1* | 11/2019 | Ruiz | ................. | G06F 16/24537 |
| 2022/0058195 A1* | 2/2022 | Jiang | ....................... | G06F 16/22 |
| 2022/0269680 A1* | 8/2022 | Li | ............................ | G06N 5/04 |

OTHER PUBLICATIONS

Mohamad Baraa, Laurent d' Orazio, Gruenwald Le, "Towards a Hybrid Row-Column Database for a Cloud-based Medical Data Management System", Aug. 31, 2012, URL=https://dl.acm.org/doi/abs/10.1145/2347673.2347675, pp. 1-4, download date Nov. 9, 2020 (Year: 2012).*

* cited by examiner

DATABASE QUERY SPLITTING

BACKGROUND OF THE INVENTION

Cloud service platforms allow a business to host a network accessible service with many benefits over a traditional software application including increased accessibility and availability. Unlike traditional applications, such as desktop applications, customers can access the services from a variety of network clients often with only minimal limitations on the client. Cloud-based services also offer improved flexibility. For example, the services can be updated and deployed under the guidance and control of the service provider. With cloud-based services, persistent state is often required due to their network and distributed nature. Many cloud services rely on one or more forms of data storage for storing persistence information. Often, cloud services will utilize a database server for storing persistent data. Databases, including relational databases, allow an application to store and subsequently query a diverse and large dataset. For example, these databases can be used to store and retrieve data such as customer and application data. As cloud services become increasingly complex and feature rich, the amount and complexity of the dataset and dataset relationships can increase. Demand for increased performance and availability of the data tier of the cloud service can also increase.

BRIEF DESCRIPTION OF THE DRAWINGS

Various embodiments of the invention are disclosed in the following detailed description and the accompanying drawings.

DETAILED DESCRIPTION

Figure 1:
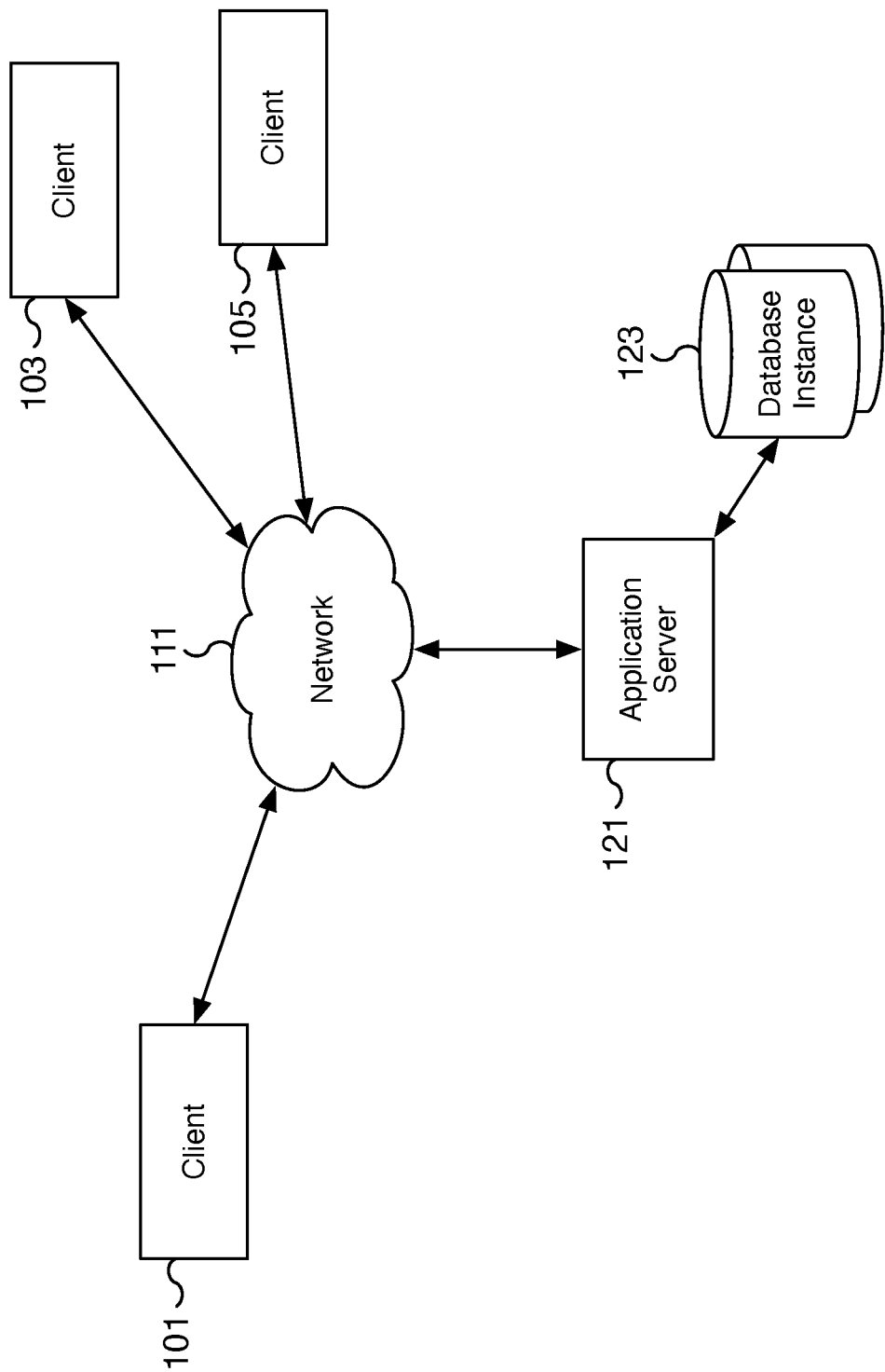
FIG. 1 is a block diagram illustrating an example of a network environment of a database-backed cloud service that supports the automatic splitting of database queries.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A database query engine for splitting database queries is disclosed. Using the disclosed techniques, a database query directed to a database instance is analyzed by a query engine to determine an optimal execution path for the query. In various embodiments, the disclosed database instance includes multiple database services implemented by different database servers and storage engines. For example, a database instance can include a column-store database service and a row-store database service, each with their own corresponding column-oriented and row-oriented storages, respectively. In various embodiments, the two database services are synchronized and maintain consistent database records. For example, changes to the data at one database storage is replicated at the other database storage. The synchronization allows either of the database services to execute a portion of the database query with consistent results. Depending on the specific database query, different database queries are more efficiently executed by the column-store database service or the row-store database service. For a certain subset of received queries, however, the database query can be more efficiently executed by splitting the database query into multiple component queries, such as a column-oriented database component query and a row-oriented database component query. The query engine identifies a database query as meeting criteria to split the database query and in response generates a first component query from the database query for execution by the column-store database service. The query engine also generates a second component query from the database query based on the output of the execution of the first component query but for execution by the row-store database service. The result of executing the different split component queries of the database query using the different database services is the result of the database query. By splitting the execution of the query across the two different database services, the execution result of the database query is optimized. In various embodiments, the performance of the split database query is improved significantly in comparison to executing the database query entirely using either the column-store database service or the row-store database service alone.

In some embodiments, a database query is received. For example, a SQL query is received at a database instance. The database instance includes multiple database services such as two different database servers, each optimized for executing different types of database queries. A determination is made whether the database query is to be processed by either a first database or a second database or at least in part processed by both the first database and the second database. For example, a query engine of the database instance receives the database query and determines whether the database query should be executed by only a single database server or whether the database query should be split into two component queries and executed using two different database servers. In some embodiments, the determination is made at least in part by determining whether the database query meets criteria to split the database query for processing across the first database and the second database, wherein the first database and the second database store shared synchronized records. In some embodiments, the first database is configured to store the synchronized records in a column-oriented format, and the second database is configured to store the synchronized records in a row-oriented format. For example, at least a portion of the data records of the two database servers of the database instance are synchronized and the synchronized records remain consistent between the different database servers. A query engine of the database instance analyzes the database query to identify factors that predict that the query will be more efficiently executed by splitting the query into two components. For example, a first component of the database query executes more efficiently on a column-store database service and a second component of the database query executes more efficiently on a row-store database service. The two different database storages utilize different storage techniques and allow different components of the database query to run more efficiently as a split query.

In various embodiments, in response to a determination that the database query meets the criteria to split the database query, a first component query of the database query for the first database and a second component query of the database query for the second database are generated. For example, a query engine of the database instance identifies an optimal component of the query for execution using the first database service and generates a corresponding first component query for the first database service. Similarly, the query engine identifies the optimal component of the query for execution using the second database service and generates a corresponding second component query for the second database service. In some embodiments, the second component query is based at least in part on a result of the first component query. For example, the output of the results from executing the first component query using the first database service is used to generate the second component query. In some embodiments, the first component query and the second component query are executed in a pipelined manner. For example, the split query can be partitioned into batches with each batch executed separately. A result of a first batch of the first component query is used to generate a first batch of the second component query. As the first batch of the second component query is being executed using the second database service, a second batch of the first component query is executed using the first database service. In various embodiments, the two database services can execute their respective components in parallel, each potentially executing a different partitioned batch of the original database query. By pipelining the execution of the first component query and the second component query, the two different database services can be more efficiently utilized resulting in significant performance gains.

FIG. 1 is a block diagram illustrating an example of a network environment of a database-backed cloud service that supports the automatic splitting of database queries. In the example shown, clients 101, 103, and 105 access cloud-based services hosted by application server 121 via network 111. Network 111 can be a public or private network. In some embodiments, network 111 is a public network such as the Internet. In various embodiments, clients 101, 103, and 105 are network clients such as web browsers for accessing web services. Application server 121 provides web services including web applications such as web-based configuration management database (CMDB) services. Application server 121 utilizes database instance 123 for storing and retrieving data. For example, data is written to and retrieved from database instance 123. In various embodiments, database instance 123 is composed of at least two databases including a column-store database and a row-store database. Each database of database instance 123 may be optimized for different workloads and at least a portion of the database records are synchronized between the other databases of database instance 123. For example, a first database of database instance 123 is a column-store database and keeps synchronized records with a second database of database instance 123 that is a row-store database. The two databases utilize different storage and retrieval techniques and are optimized for different types of queries. For example, the column-store database may be optimized for column-based operations and a row-store database may be optimized for row-based operations. In various embodiments, database instance 123 responds to database queries originating from application server 121. The database query can be executed by using either the column-store database of database instance 123, the row-store database of database instance 123, or a combination of the column-store and row-store databases of database instance 123.

In some embodiments, cloud-based services can be implemented by pairing application server 121 and database instance 123. Application server 121 can utilize database instance 123 to provide certain services. For example, database instance 123 can function as a configuration management database (CMDB) used by application server 121 for providing CMDB services. Among other information, database instance 123 can store configuration information related to managed assets, such as related hardware and/or software configurations. In some embodiments, database instance 123 is a persistent computer storage that is network accessible and used to store and query customer data. In various embodiments, database instance 123 can be utilized to store customer information for one or more different customers. In the example shown, database instance 123 is shown with two overlapping database symbols to indicate that database instance 123 includes at least a column-store database and a row-store database. Although database instance 123 can utilize a column-store database service, a row-store database service, or a combination of the two different database services for servicing database queries, from the perspective of a database client, such as from the perspective of application server 121, database instance 123 responds and appears as a single database service. For example, database instance 123 returns identical result values to SQL queries regardless of whether the actual SQL query request is executed by the column-store database service of database instance 123, the row-store database service of database instance 123, or a combination of the two different database services.

In some embodiments, database instance 123 includes multiple database components (not shown) including a query engine, a column-store database service, a column-store database storage, a row-store database service, and a row-store database storage. Database instance 123 responds to database queries such as SQL commands. In various embodiments, the query engine (not shown) of database instance 123 will receive and analyze a database query and route the query to the appropriate database service(s), for example, the column-store database service, the row-store database service, or both services in the event the query is split. In analyzing the database query, the query engine will determine whether the database query meets the criteria to split the database query. In response to determining that the query is more efficiently serviced by splitting the query, the query engine generates from the database query a first component query for execution by the column-store database service and a second component query for execution by the row-store database service. The query engine generates the second component query based on the output of the execution of the first component query. For improved performance, the database query can be partitioned into batches and the two component queries can be executed in a pipelined manner.

In some embodiments, the query engine will additionally translate a database query (or component query) from one database query language to another as required. For example, the column-store database service and the row-store database service of database instance 123 may utilize different database query languages. The query engine translates the database query received by database instance 123 into the appropriate database service language before routing the translated query to the corresponding database service for execution. In various embodiments, once the database query has been executed by the appropriate database service(s), the query results are returned to the database client, such as application server 121. In various embodiments, the database storages of the various databases of database instance 123 keep synchronized records. For example, a query directed for execution by the column-store database returns the same results as if the query were executed by the row-store database.

Although single instances of some components have been shown to simplify the diagram, additional instances of any of the components shown in FIG. 1 may exist. For example, application server 121 may include one or more servers. Similarly, database instance 123 may include one or more database instances and may not be directly connected to application server 121. For example, database instance 123 and its components may be replicated and/or distributed across multiple servers and/or components. In some embodiments, components not shown in FIG. 1 may also exist.

Figure 2:
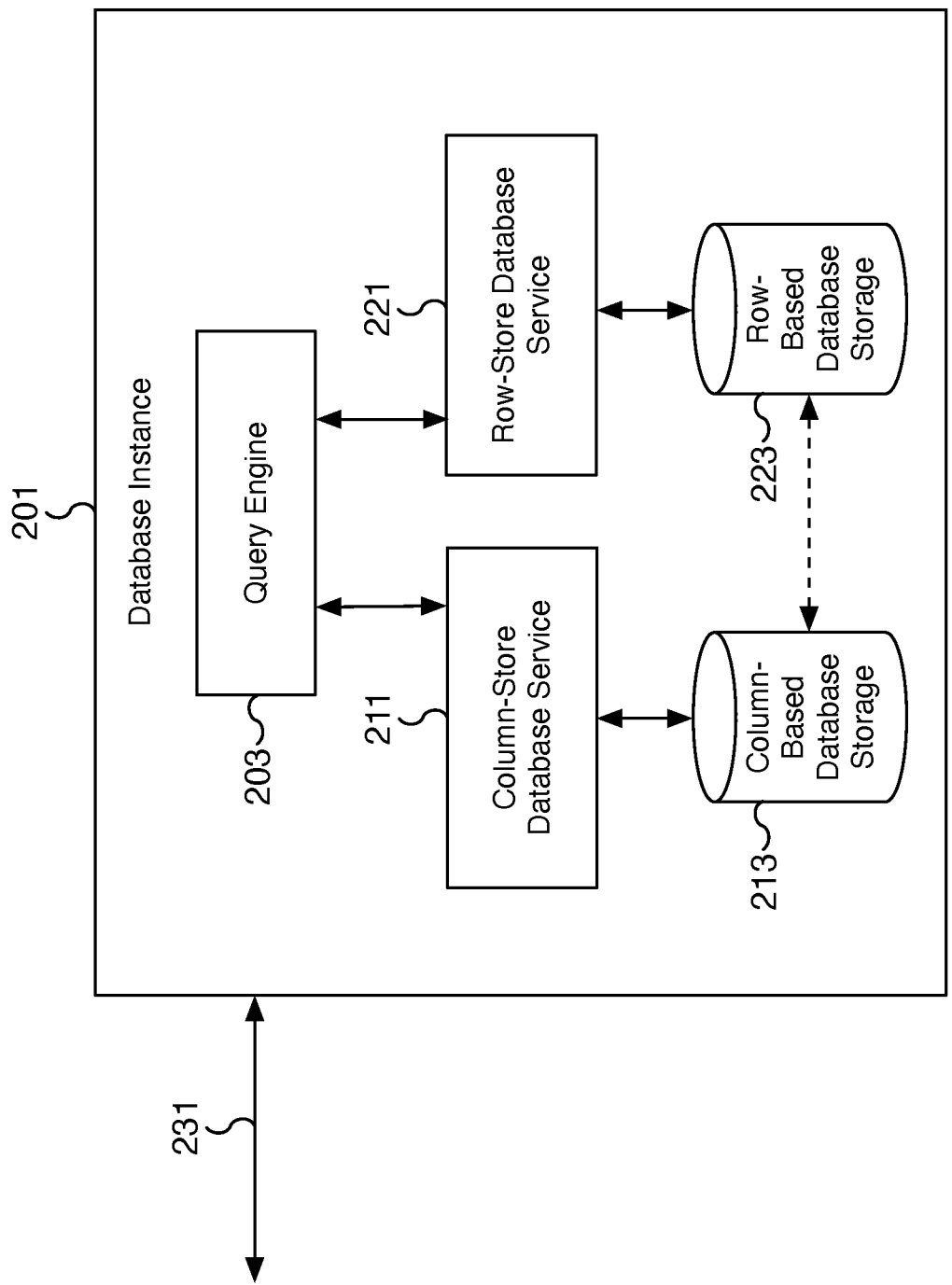
FIG. 2 is a block diagram illustrating an example of a database instance that supports multiple database services and the automatic splitting of database queries.

FIG. 2 is a block diagram illustrating an example of a database instance that supports multiple database services and the automatic splitting of database queries. In the example shown, database instance 201 includes query engine 203, column-store database service 211, column-based database storage 213, row-store database service 221, row-based database storage 223, and network connection 231. In various embodiments, database instance 201 functions as the backend database of one or more cloud services such as the services described with respect to FIG. 1. In some embodiments, database instance 201 is database instance 123 of FIG. 1 and network connection 231 communicatively connects database instance 201 to application server 121 of FIG. 1. In some embodiments, database instance 201 functions as a configuration management database (CMDB). The dotted arrow between column-based database storage 213 and row-based database storage 223 indicates that the two database storages synchronize at least a portion of their database records. For example, column-based database storage 213 and row-based database storage 223 can synchronize a portion or all of their respective database records. The data records of column-based database storage 213 and row-based database storage 223 are stored using different storage formats and accessed using different techniques.

In some embodiments, incoming database requests are received at database instance 201 via network connection 231 and forwarded to query engine 203 for processing. Query engine 203 analyzes the request and determines whether the request should be processed by column-store database service 211 alone, by row-store database service 221 alone, or by a combination of both column-store database service 211 and row-store database service 221 after splitting the query. The analysis performed by query engine 203 involves evaluating the query to determine which of the three execution paths is most appropriate. Factors that are considered when determining which database service to route the query to include the expected response time, time trend requests, the number of aggregate functions used by the query, and/or the number of projections of the query, among other factors. In various embodiments, query engine 203 evaluates the query to determine if the query meets the criteria for splitting the query into two components, a column-store component query and a row-store component query. The analysis for splitting can include identifying the component of the query most appropriate for execution by a column-store database service such as column-store database service 211 and the component of the query most appropriate for execution by a row-store database service such as row-store database service 221. In some embodiments, query engine 203 splits the query into two component queries. The query results from the execution of the first component query by one database service are used to complete the second component query for execution by the second database service. For example, the results from executing the component query for column-store database service 211 are used to complete the component query for row-store database service 221. The column-store portion of the query is executed quickly and efficiently by the column-store database and the results are used for completing the construction of the row-store portion of the query, which is executed quickly and efficiently on the row-store database.

In some embodiments, query engine 203 identifies the column-store component and row-store component of a database query and splits the two. The column-store component can correspond to a WHERE or JOIN clause which is column-oriented. Examples of a column-oriented database query WHERE clause include clauses that utilize one or more aggregate functions such as count, multiply, and sum functions. By identifying and splitting the column-store component of the database query, the column-store component can be more efficiently executed using column-store database service 211. In contrast to the column-store component, the row-store component of the database query can correspond to a SELECT clause that is row-oriented. Examples of a row-oriented database query SELECT clause include clauses that utilize multiple projections. The row-store component of the database query can be more efficiently executed using row-store database service 221. By splitting a column-oriented database query WHERE or JOIN clause from a row-oriented database query SELECT clause, two separate component queries are generated by query engine 203, and each can be executed by its own respective database service to optimize query performance. In various embodiments, query engine 203 combines the results of the two component queries by incorporating the results for the component query generated from the column-oriented database query WHERE or JOIN clause into the generation of the component query generated from the row-oriented database query SELECT clause. In various embodiments, the results from executing the row-oriented component query using row-store database service 221 correspond to the database query results and are returned to the database client via network connection 231.

In the example shown, column-store database service 211 and row-store database service 221 each utilize their own corresponding database storages, column-based database storage 213 and row-based database storage 223, respectively, for servicing database query requests. For example, column-based database storage 213 and row-based database storage 223 each store database data, such as database records, in their respective formats and/or data structures. Each database service and storage are also optimized for the retrieval and update of data related to different types of database queries. In the example shown, column-based database storage 213 stores and utilizes data in a column-store format whereas row-based database storage 223 stores and utilizes data in a row-store format. In various embodiments, for the synchronized database records between the two database services, updates to the data of one database storage are replicated to the other database storage. For example, an update to database records in column-based database storage 213 is replicated for the corresponding synchronized records in row-based database storage 223.

In various embodiments, in generating the different component queries when splitting a database query, query engine 203 further translates the component query into a database query language compatible with the target database service. For example, a component query routed to column-store database service 211 is translated to the database query language compatible with column-store database service 211. Similarly, a component query routed to row-store database service 221 is translated to the database query language compatible with row-store database service 221. In some embodiments, the results returned from executing a component query by column-store database service 211 and/or row-store database service 221 are processed so that they are compatible with the other database service and/or the network client requesting the database query. For example, results from execution of a first component query by column-store database service 211 may be processed as part of integrating the results into a second component query for execution by row-store database service 221. In various embodiments, the translation is performed by query engine 203. In some embodiments, query engine 203 includes a translation module for translating between different database query languages or dialects.

Although single instances of some components have been shown to simplify the diagram of database instance 201, additional instances of one or more of the components shown in FIG. 2 may exist. For example, database instance 201 may include multiple instances of column-store database service 211 and/or row-store database service 221. The multiple instances can be used to process multiple requests or batches for each type of service in parallel. Database instance 201 may also include multiple distributed (and/or replicated) database storages corresponding to multiple instances of column-based database storage 213 and/or row-based database storage 223. In some embodiments, components of database instance 201 not shown in FIG. 2 may also exist.

Although query engine 203 is shown as part of database instance 201, in some embodiments, query engine 203 exists as part of a default database service. For example, row-based database storage 223 may operate as a default database service that initially processes all incoming database query requests. If included as a component of a default row-store database service, query engine 203 can receive the incoming request, split the query if appropriate, and route the column-store component query to the column-store database service. The results from executing the column-store component query are used by query engine 203 to generate the row-store component query that is processed by the default row-store database service.

Figure 3:
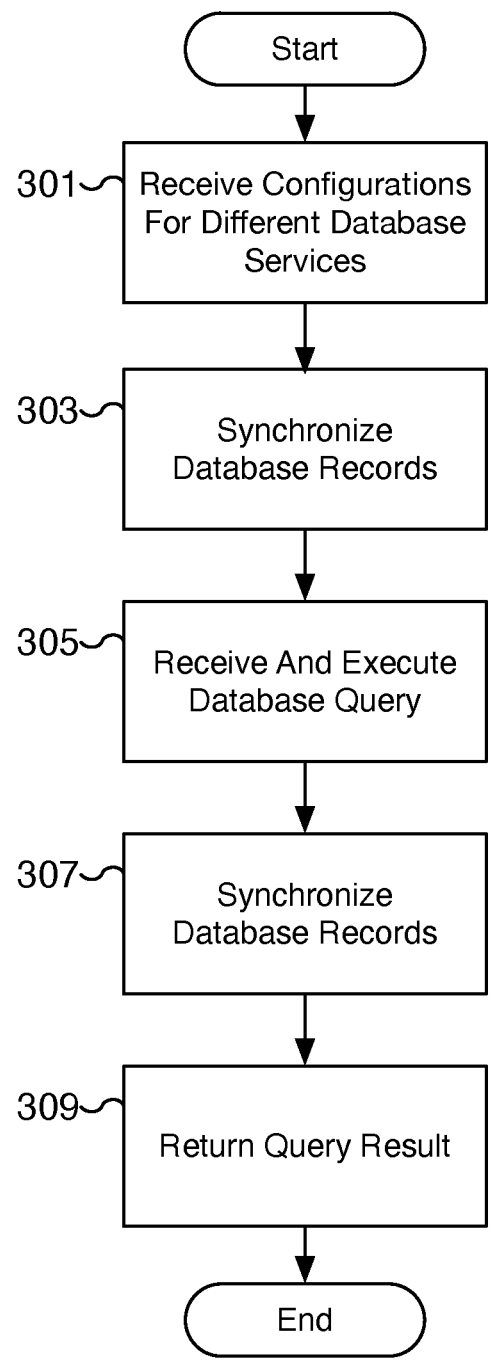
FIG. 3 is a flow chart illustrating an embodiment of a process for configuring and utilizing a database instance that supports multiple database services and the automatic splitting of database queries.

FIG. 3 is a flow chart illustrating an embodiment of a process for configuring and utilizing a database instance that supports multiple database services and the automatic splitting of database queries. Using the process of FIG. 3, a database-backed cloud service can achieve significant performance gains by utilizing a database instance that supports splitting a database query for execution across multiple database services. For example, applying the process of FIG. 3, the response time of and/or performance impact associated with database requests can be significantly improved by directing different component queries of a database query to different database services of the database instance. In some embodiments, the process of FIG. 3 is applied to a database instance with a column-store database service and a row-store database service and separate component queries are generated from a database query for each service. Although the process of FIG. 3 is described with respect to the process flow of a single database query, the same techniques apply for servicing multiple queries after the initial configuration steps of 301 and 303 by looping through steps 305, 307, and 309. In some embodiments, the database instance is database instance 123 of FIG. 1 and/or database instance 201 of FIG. 2. In some embodiments, the column-store database service is column-store database service 211 of FIG. 2 and the row-store database service is row-store database service 221 of FIG. 2. In some embodiments, the database-backed cloud service is hosted by application server 121 of FIG. 1.

At 301, configurations for the different database services are received. For example, a column-store database service and a row-store database service are configured for servicing database requests. The configuration can include configuring their respective database storages. In some embodiments, the configuration further includes identifying which database records should be synchronized across the two database services. For example, some or all of the database records of the column-store database service and a row-store database service are identified and replicated as synchronized database records. Any updates to the synchronized database records by either of the database services result in updates to the corresponding records on the other database service. The synchronization allows database queries that include the synchronized database records to return the same results regardless of which database service services the database query. In some embodiments, the configuration includes configuring the database storages including enabling and/or disabling features to optimize the different database services.

In some embodiments, the configuration includes configuring the setting for invoking database query splitting. For example, threshold values and criteria parameters can be configured to enable a database query to be split into two component queries and executed across the column-store database service and a row-store database service of the database instance. In some embodiments, one or more configuration thresholds are configured to trigger splitting such as thresholds based on the expected response times of different components of a query, the number of aggregate functions of a query, and/or the number of projections of a query, among other factors.

In some embodiments, the configuration includes configuring settings for translating the database query and component queries between different database service languages. For example, translation rules can be configured to support the translation of a database query into another database query language such as a language supported by a database client, the column-store database service, and/or the row-store database service of the database instance.

At 303, database records are synchronized. For example, database records configured at 301 for synchronization between the column-store database service and a row-store database service are synchronized to prepare the database instance for servicing requests that involve database query splitting.

At 305, a database query is received and executed. For example, the database query is processed and executed by the database instance using one or more database services of the database instance. In various embodiments, the query is analyzed to determine whether the query should be split. For example, a query engine of the database instance can analyze the query to determine whether the query meets the criteria for splitting. In response to a determination by the query engine to split the query, two component queries are generated, one for the column-store database service and one for the row-store database service. In some embodiments, the query results from executing the component query for the column-store database service are used to complete the generated component query for the row-store database service. The query results from executing the component query for the row-store database service correspond to the results for the database query. In some embodiments, the query is partitioned into batches and/or pipelined. For example, different batches of the component queries can execute on the different database services in parallel and in a pipelined manner.

In the event the database query does not meet the criteria for splitting, the query engine can route the database query to one of the database services of the database instance, such as either the column-store database service or the row-store database service, for processing. In some embodiments, a default database service is configured and used for non-split database queries. For example, the row-store database service can function as the default database service. In some embodiments, the database instance further analyzes the database query to determine which of the two database services the query should be routed to for processing. The determination can be determined based on multiple factors including the resource demands of the query and/or the predicted performance of the query on each database service.

At 307, database records are synchronized. For example, modifications to any synchronized database records resulting from executing the database query at 305 are replicated to maintain consistency across the database services. By maintaining data consistency among the synchronized database records, subsequent queries can be serviced by splitting the query and utilizing both database services.

At 309, the query result is returned. The results from executing the database query, including queries that are split, are returned to the database client. In some embodiments, the results returned are batched results and/or the results may be streamed to the database client as the intermediate results are retrieved from one or more database services. In various embodiments, the database instance is ready for serving additional requests. For example, additional database queries can be processed by looping back to step 305 (not shown) to receive a new database query from a database client.

Figure 4:
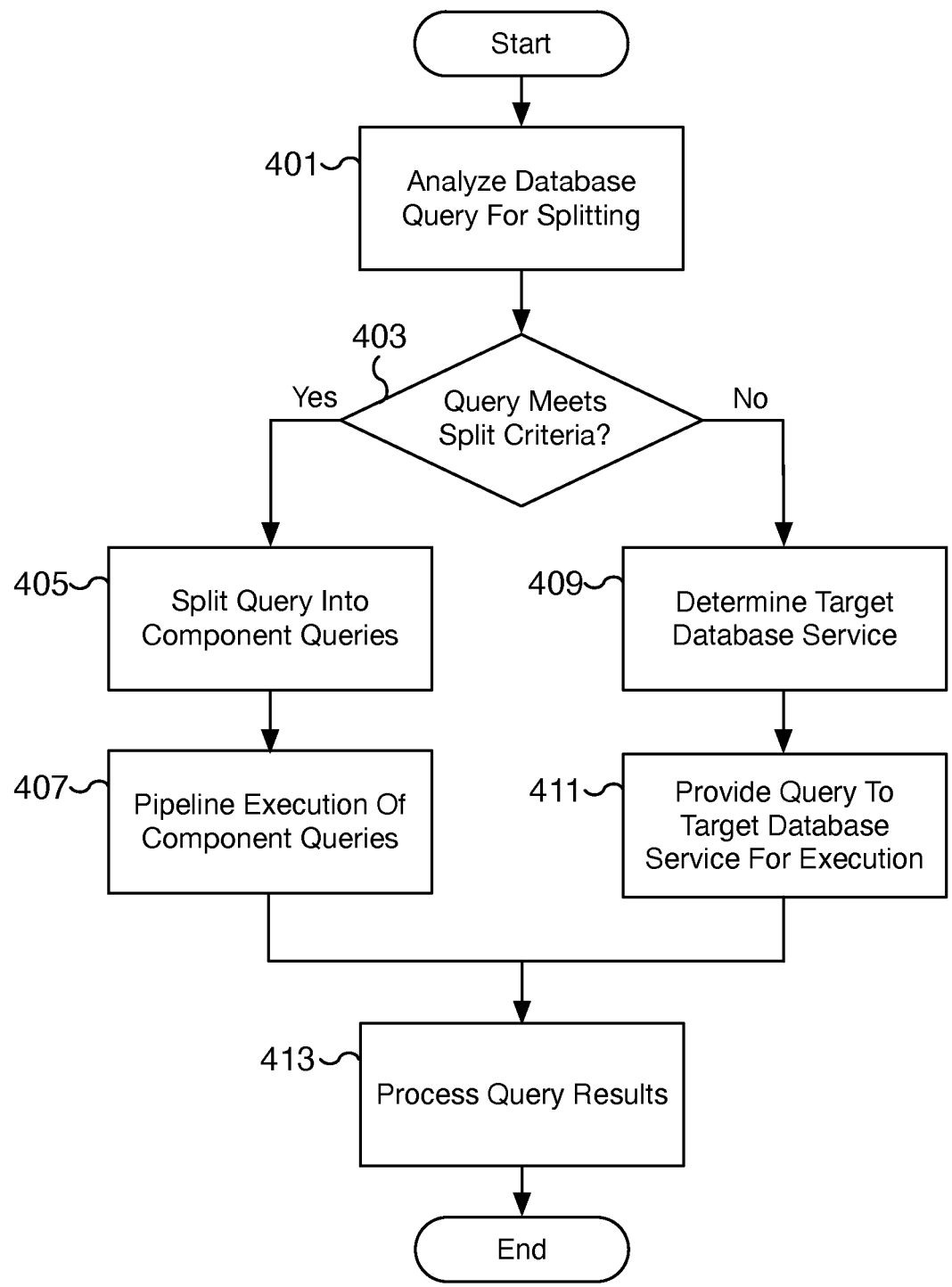
FIG. 4 is a flow chart illustrating an embodiment of a process for executing a database query utilizing a database instance that supports multiple database services and the automatic splitting of database queries.

FIG. 4 is a flow chart illustrating an embodiment of a process for executing a database query utilizing a database instance that supports multiple database services and the automatic splitting of database queries. Using the process of FIG. 4, a database instance executes a database query at least in part by automatically determining whether the query should be split and processed by two different database services of the database instance or whether the query should be processed by a single database service of the database instance. For example, in some scenarios, a query is more efficiently executed by splitting the query into a first component query for a column-store database service and a second component query for a row-store database service and pipelining the execution of the two component queries. In some embodiments, the database instance is database instance 123 of FIG. 1 and/or database instance 201 of FIG. 2 and the process of FIG. 4 is performed at 305 of FIG. 3 by a query engine of a database instance such as query engine 203 of FIG. 2. In some embodiments, the two database services of the database instance are a column-store database service such as column-store database service 211 of FIG. 2 and a row-store database service such as row-store database service 221 of FIG. 2.

At 401, a database query is analyzed for splitting. For example, a database query is received and analyzed to determine whether the query meets the criteria to split the database query. Factors that are considered when determining whether to split the query include the expected response time, the number of projections of the query, the number of aggregate functions used by the query, and/or the number of tables referenced by a JOIN operation, among other factors. The factors can be evaluated and compared to threshold values used to determine whether the query meets the criteria for splitting. For example, a database query can be identified for splitting if the number of projections of the query exceeds a configured projection threshold value and either the number of aggregate functions used by the query exceeds an aggregate function threshold value or the number of tables referenced by a JOIN operation exceeds a JOIN operation threshold value. In some embodiments, the analysis for splitting includes identifying and evaluating potential components of the query most appropriate for execution by the column-store database service and potential components of the query most appropriate for execution by the row-store database service.

At 403, a determination is made whether the query meets the criteria for splitting. In the event the query meets the criteria for splitting, processing proceeds to 405 where the query is split into component queries. In the event the query does not meet the criteria for splitting, processing proceeds to 409 where a target database service is determined for processing the database query.

At 405, the database query is split into component queries. For example, a column-store component query and a row-store component query are generated from the database query. In some embodiments, the result values from executing a first component query are used to complete the generation of the second component query. For example, the output of a column-store component query generated from the WHERE or JOIN clause of a database query is used to create the row-store component query generated from the SELECT clause of the database query. In various embodiments, the second component query can be initially created to reference the result of the first component query.

At 407, the execution of the component queries is pipelined. For example, using the split component queries generated at 405, the component queries are routed to their corresponding database services and executed. In some embodiments, the column-store component query is first routed to and executed by the column-store database service. The results of the execution are used to complete the generation of the row-based component query, which is then routed to and executed by the row-store database service. In various embodiments, the two component queries are executed in a pipelined manner, with the input of the second row-store database service stage dependent on the output of the first column-store database service stage. In some embodiments, the query is partitioned into multiple batches and the batches are processed within the execution pipeline.

At 409, a target database service is determined. For example, a determination is made at 403 that the query should not be split, and a single database service is selected for executing the database query. In some embodiments, a default database service is used without further analysis. In some embodiments, the query engine further analyzes the database query to determine which of the two database services the query should be routed to for processing. The determination can be determined based on multiple factors including the resource demands of the query, the current loads of the different services, and/or the predicted performance of the query on each database service. For example, a predicted response time can be determined for executing the query using each service and the database service with the fastest predicted response time is selected as the target database service. In some embodiments, the type of the request is used to determine the target database service. For example, analytical queries can be directed to the column-store database service and non-analytical queries to the row-store database service.

At 411, the query is provided to the target database service for execution. For example, the database query is routed to and executed by the target database service selected at 409. In various embodiments, in the event the query requires translation, the query is translated to the database query language of the target database service. For example, in the event the target database service is the column-store database service and the database query is provided in the query language of the row-store database service, the database query is first translated to the query language of the column-store database service before it is routed to and executed by the column-store database service of the database instance.

At 413, the query results are processed. For example, the query results from either executing a split query at 407 or a non-split query at 411 are collected and processed. In some embodiments, the results from the execution may be streamed as batch results and the collected batch results are integrated. In some embodiments, the processing may include transforming the results into a format expected by the database instance and/or database client.

Figure 5:
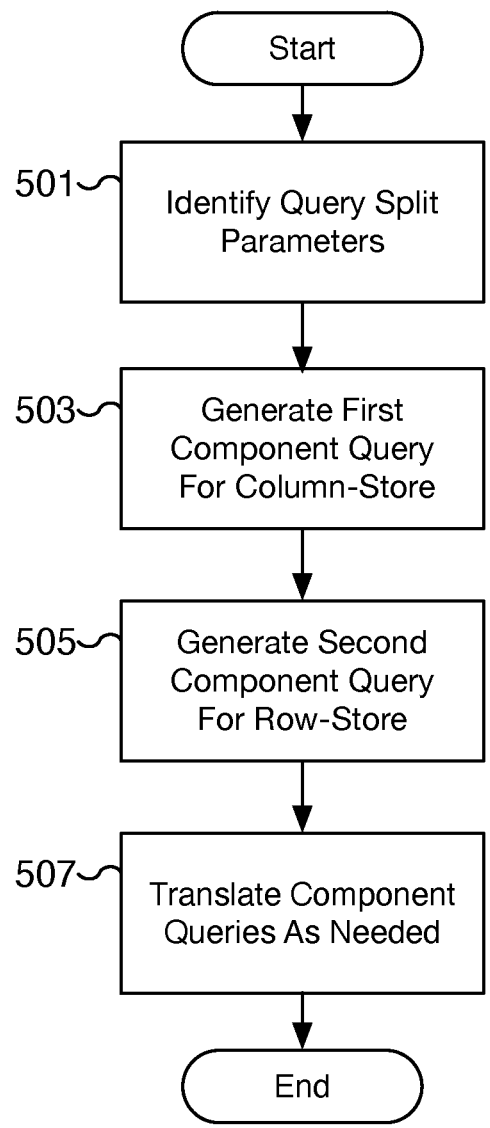
FIG. 5 is a flow chart illustrating an embodiment of a process for automatically splitting a database query.

FIG. 5 is a flow chart illustrating an embodiment of a process for automatically splitting a database query. Using the process of FIG. 5, a database instance can split a database query into component queries for processing by two different database services of the database instance. For example, a query can be split into a component query for a column-store database service and a component query for a row-store database service. Each component can be executed more efficiently by its corresponding database service compared to processing the database query using only a single database service. In some embodiments, the database instance is database instance 123 of FIG. 1 and/or database instance 201 of FIG. 2 and the process of FIG. 5 is performed by a query engine of a database instance such as query engine 203 of FIG. 2. In some embodiments, the process of FIG. 5 is performed at 305 of FIG. 3 and/or at 401, 403, and/or 405 of FIG. 4. In some embodiments, the two database services of the database instance are a column-store database service such as column-store database service 211 of FIG. 2 and a row-store database service such as row-store database service 221 of FIG. 2.

At 501, split parameters for the query are identified. For example, the query is analyzed to determine a column-store component and a row-store component. In some embodiments, the query is first parsed into a tree structure to identify component queries. For example, the query can then be analyzed to identify sub-trees corresponding to components of the query that are best executed using a column-store database service. The corresponding remaining queries can be analyzed for execution by a row-store database service. In various embodiments, a component query can depend on another component query. For example, a component query based on the root node of the query tree is dependent on the results of a component query based on a sub-tree of the query tree. In some embodiments, the output or query result from a component query of a column-store database query is used as the input for a component query of a row-store database query.

In some embodiments, the column-store component can correspond to a WHERE or JOIN clause which is column-oriented. Examples of a column-oriented database query WHERE clause include clauses that utilize one or more aggregate functions such as count, multiply, and sum functions. Examples of a column-oriented database query JOIN clause include JOIN clauses that operate on multiple tables. The column-store component of the database query is identified and split from the original database query. In some embodiments, a WHERE or JOIN clause is identified for the column-store component. The identified column-store component is more efficiently executed using a column-store database service. In contrast to the column-store component, the row-store component of the database query can correspond to a SELECT clause that is row-oriented. Examples of a row-oriented database query SELECT clause include clauses that utilize multiple projections, such as a SELECT * clause. The row-store component of the database query is identified and split from the original database query. In some embodiments, a SELECT clause is identified for the row-store component. The row-store component is more efficiently executed using a row-store database service. By splitting a column-oriented database query WHERE or JOIN clause from a row-oriented database query SELECT clause, two separate component queries can be generated by the query engine, and each can be executed by its own respective database service to optimize query performance.

In some embodiments, at 501, the query split parameters for generating the component queries include any required references between the two component queries, such as a reference to an output result of one component query for use as an input to another component query. For example, a row-store component query can be dependent on the result of the column-store component query. When identifying the parameters for splitting the query, a reference to the output result of the column-store component query is created for the row-store component query. In some embodiments, the identified query split parameters include an identified node of the query tree representing where and/or how the query should be split. Although the column-store and row-store components are described with respect to WHERE, JOIN, and SELECT portions of a query, other component clauses and their respective nodes of a query tree can be appropriately targeted and split for column-store or row-store database services.

In some embodiments, the criteria for splitting a query is based at least on the number of projections of the database query exceeding a configured projections threshold value. A query with the number of projections that exceeds a threshold value of projections is predicted to have a component of the query that executes more efficiently using a row-store database service than a column-store database service. Additionally, the query is identified to determine whether the query involves column-based functionality such as a complex WHERE clause, a JOIN operation with multiple tables, or an aggregate function, among other column-based functionality. A query with these identified factors can be predicted to have a component of the query that executes more efficiently using a column-store database service than a row-store database service. The various factors can be evaluated for and compared to threshold values used to determine query splitting parameters. For example, a database query can be identified for splitting if the number of projections of the query exceeds a configured projection threshold value and either the number of aggregate functions used by the query exceeds an aggregate function threshold value or the number of tables referenced by a JOIN operation exceeds a JOIN operation threshold value. In some embodiments, the analysis for splitting includes identifying and evaluating potential components of the query most appropriate for execution by the column-store database service and potential components of the query most appropriate for execution by the row-store database service.

As an example of the analysis and splitting of a database query, the following example database query is received for analysis to identify parameters for splitting: SELECT * FROM task INNER JOIN cmdb ON task.cmdb_item=cmdb.system_id ORDER BY task.description LIMIT 1;. For the received query and this example scenario, the number of projections (SELECT * FROM) is greater than 100 projections and exceeds a configured projections threshold value. The query is also analyzed to identify the column-based JOIN functionality. The two identified criteria are used to identify the split parameters used to split the query into two component queries. The row-store component query retains the operation for evaluating a large number of projections (SELECT * FROM) and corresponds to the component query: SELECT * FROM task INNER JOIN cmdb ON task.cmdb_item=cmdb.system_id WHERE=db.system_id='101';. The corresponding column-store component query corresponds to the component query for performing the column-based JOIN functionality of the database query(INNER JOIN): SELECT cmdb.system_id FROM task INNER JOIN cmdb ON task.cmdb_item=cmdb.system_id ORDER BY task.description LIMIT 1;. The output of the column-store component query (cmdb.system_id='101') is used as input for the row-store component.

At 503, a first component query for a column-store database service is generated. For example, the first component query is generated by extracting the column-store portion of the database query using the query split parameters identified at 501 to create a component query for the column-store database service. In some embodiments, the first query component corresponds to a column-based query such as a WHERE clause of the database query that utilizes one or more aggregate functions. The first component query is optimized for execution by a column-store database service that utilizes a column-based database storage and related access techniques.

At 505, a second component query for a row-store database service is generated. For example, the second component query is generated by extracting the row-store portion of the database query using the query split parameters identified at 501 to create a component query for the row-store database service. The second component query can include a reference to the output results of the first component query generated at 503. For example, the second component query can utilize the output of the execution of the first query component as an input parameter. In some embodiments, the second query component corresponds to a row-based query such as a SELECT clause of the database query that includes multiple projections. The second component query can be optimized for execution by a row-store database service that utilizes a row-based database storage and related access techniques.

At 507, any query components requiring translation are translated. For example, in some embodiments, the two database services of the database instance utilize different query languages (or dialects) and do not share a compatible query language. Similarly, the database client may utilize a different database language from the column-store and row-store database services of the database instance. In various embodiments, a component query that requires translation is translated to the query language of the target database service. For example, a component query based on a database query received in the query language of the row-store database service (and/or the language used by the database client) can be translated into the language of the column-store database service.

Figure 6:
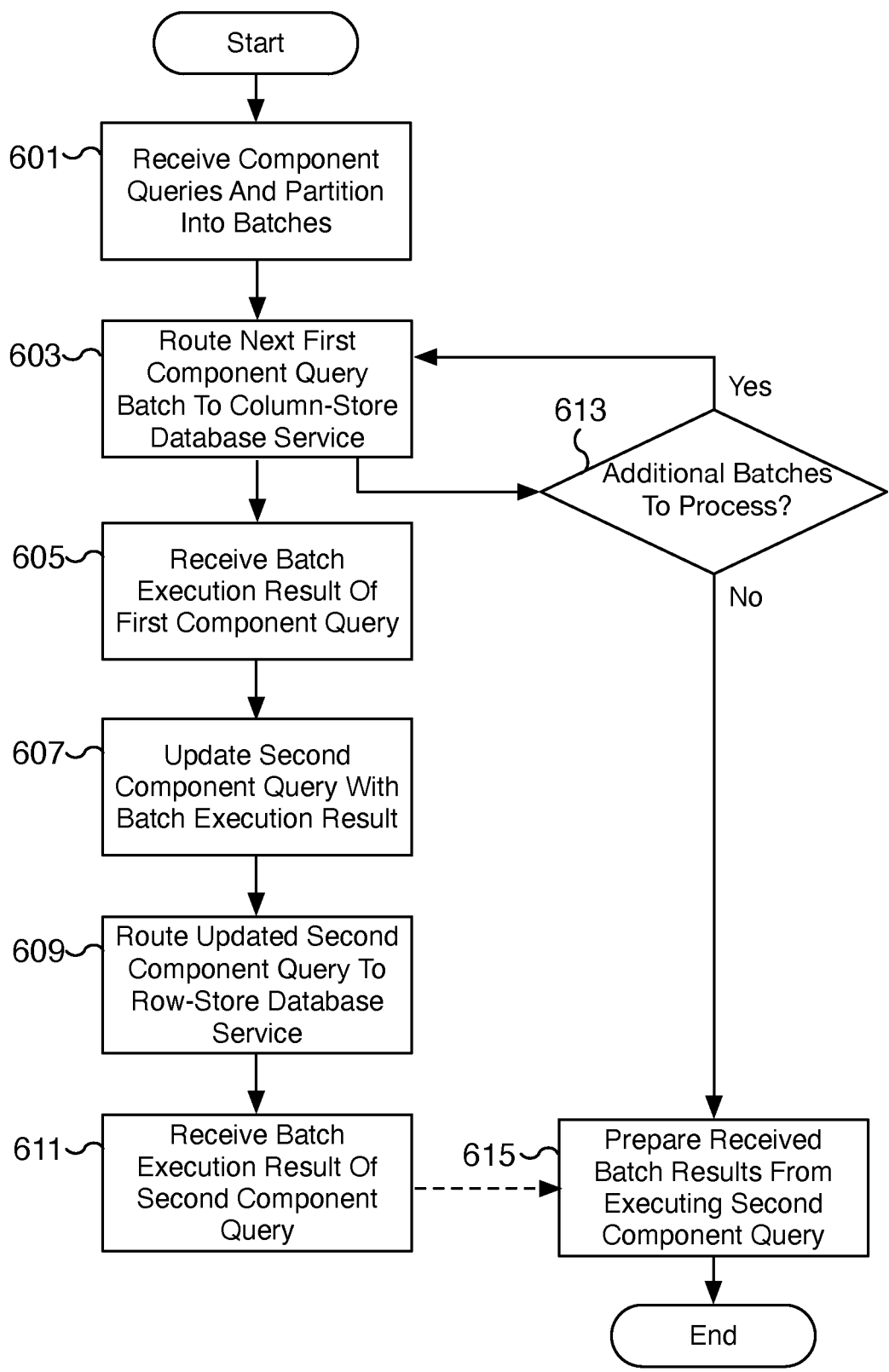
FIG. 6 is a flow chart illustrating an embodiment of a process for processing a database query that has been split into component queries for different database services.

FIG. 6 is a flow chart illustrating an embodiment of a process for processing a database query that has been split into component queries for different database services. For example, using the process of FIG. 6, a database instance can process a database query split into a component query for a column-store database service and a component query for a row-store database service across different corresponding database services. Each component can be executed more efficiently by its corresponding database service compared to processing the database query using only a single database service. Further, the two component queries can be executed in a pipelined manner. In some embodiments, the database instance is database instance 123 of FIG. 1 and/or database instance 201 of FIG. 2 and the process of FIG. 6 is performed by a query engine of a database instance such as query engine 203 of FIG. 2. In some embodiments, the process of FIG. 6 is performed at 305 of FIG. 3 and/or at 407 and/or 413 of FIG. 4. In some embodiments, the two database services of the database instance are a column-store database service such as column-store database service 211 of FIG. 2 and a row-store database service such as row-store database service 221 of FIG. 2.

At 601, component queries are received and are partitioned into batches. For example, a column-store component query and a row-store component query are received. The queries are partitioned into one or more batches for pipelining. In some embodiments, a first component query corresponds to a column-store component query and a second component query corresponds to a row-store component query. The output of the first component query may be the input for the second component query. For example, a second row-store component query is dependent on the output from executing a first column-store component query.

At 603, the next batch of the first component query is routed to the column-store database service for execution. For example, the next batch of the column-store component query available for processing is routed to the column-store database service where it is executed using column-store database techniques. In various embodiments, the step of 603 is repeated until no additional batches remain for processing. By batching multiple first component queries, the split database query can be pipelined across two stages with the execution of the first component query corresponding to the first stage of the query execution pipeline.

At 605, a batch execution result of the first component query is received. For example, the result values from executing the first component query by the column-store database service are received. In various embodiments, the received result corresponds to a batch execution result.

At 607, the second component query is updated with the batch execution result. For example, the batch execution result received at 605 is used as an input parameter for the second component query. The updated second component query corresponds to the next batch of the row-store component query that utilizes the results from executing a batch of the column-store component query.

At 609, the updated second component query is routed to the row-store database service for execution. For example, the second component query updated at 607 to generate the next batch of the row-store component query is routed to the row-store database service where it is executed using row-store database techniques. In various embodiments, the execution of the second component query corresponds to the second stage of the query execution pipeline.

At 611, a batch execution result of the second component query is received. For example, the result values from executing the second component query by the row-store database service are received. In various embodiments, the received result corresponds to a batch execution result of the database query. The dotted arrow from step 611 pointing to step 615 indicates that step 615 is dependent on step 611. However, due to the pipelined nature of the query execution, once step 611 is completed, processing does not immediately proceed to step 615. Instead, processing proceeds to step 615 from step 613 only when no additional batches remain for processing.

At 613, a determination is made whether additional batches of the database query remain for processing. In the event additional batches remain, processing loops back to step 603. In the event no additional batches remain, processing proceeds to step 615. For example, no additional batches remain when the entire database query has been processed.

At 615, the received batch execution results from executing the second component query are prepared. For example, each batch execution result received at 611 is collected and merged to prepare a query result of the database query. In various embodiments, the query result is processed before the query result is returned to a database client. In some embodiments, the query result is streamed (not shown) instead of waiting for all batches to be processed.

Figure 7:
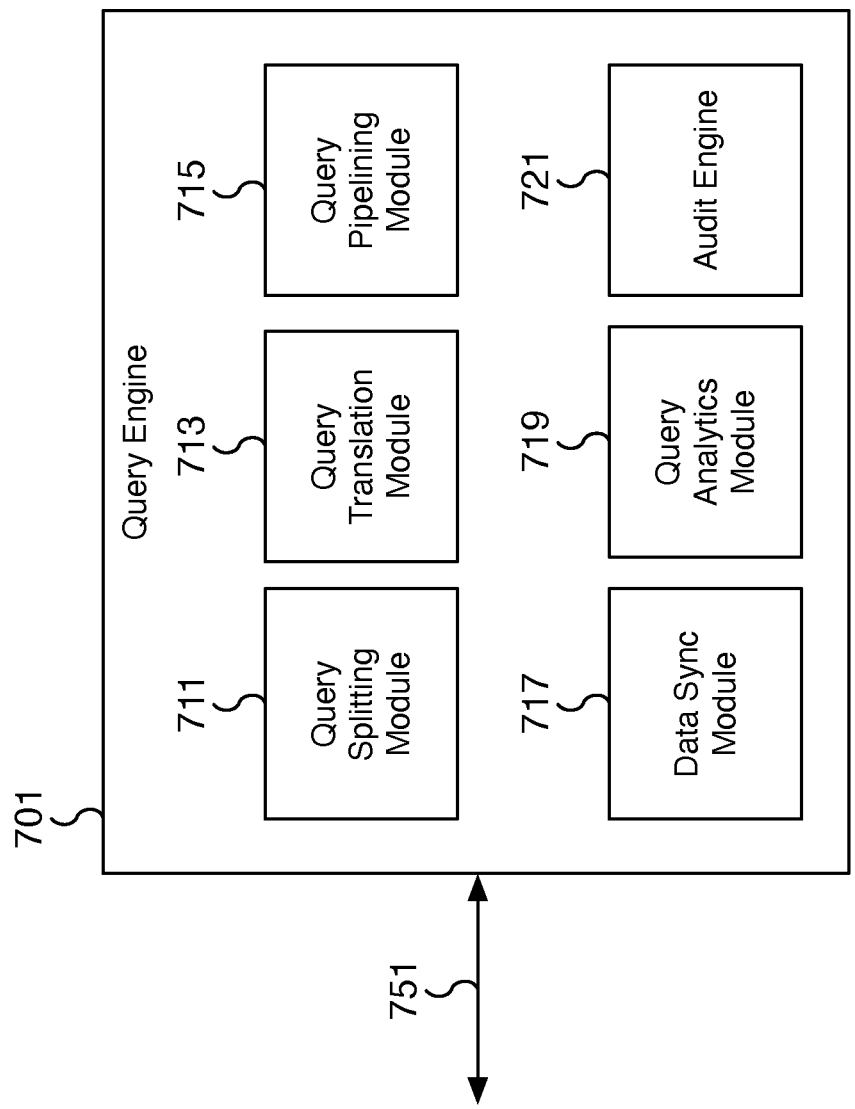
FIG. 7 is a block diagram illustrating an example of a query engine for splitting database queries.

FIG. 7 is a block diagram illustrating an example of a query engine for splitting database queries. In the example shown, query engine 701 is a query engine of a database instance and includes at least components query splitting module 711, query translation module 713, query pipelining module 715, data synchronization module 717, query analytics module 719, audit engine 721, and interface 751. In various embodiments, the processes of FIGS. 3-6 utilize at least in part one or more components of query engine 701 to analyze and split a database query into component queries for execution across different database services of a database instance. In some embodiments, query engine 701 is query engine 203 of FIG. 2 and the database instance is database instance 123 of FIG. 1 and/or database instance 201 of FIG. 2. In some embodiments, the two database services of the database instance are a column-store database service such as column-store database service 211 of FIG. 2 and a row-store database service such as row-store database service 221 of FIG. 2. In some embodiments, query engine 701 may include only a portion of the shown components. In some embodiments, components not shown in FIG. 7 may also exist.

In some embodiments, query splitting module 711 is utilized for analyzing a database query and determining whether to and how to split the query into component parts. Query splitting module 711 can analyze the query to determine whether the query should be processed by a single database service or split into a column-store component query and a row-store component query. In some embodiments, query splitting module 711 parses the query to determine query splitting parameters and then generates the different component queries. In various embodiments, query splitting module 711 interfaces with at least query translation module 713 and query pipelining module 715 for executing a split query. For example, query splitting module 711 can utilize query translation module 713 to translate a query or component query from one database service language to another database service language. In the example shown, query splitting module 711 utilizes query pipelining module 715 to pipeline the execution of the component queries. For example, by interfacing with query pipelining module 715, a first component query can be directed for execution by the column-store database service and the results can be used as an input for the second component query, which is directed for execution by the row-store database service.

In some embodiments, query translation module 713 is utilized by query engine 701 to translate a query or query component between different database query languages. In some embodiments, the different database services of the database instance utilize different and incompatible database query languages and translation is necessary when routing a query to and/or generating a component query for a target database service. For example, a column-store component query is generated from a row-store database query along with the row-store component query. Query translation module 713 can be used to translate the column-store component query into the query language supported by the column-store database service. In some embodiments, query translation module 713 is further used to translate query results. For example, query translation module 713 may be used to translate or reformat the execution results of a column-store component query so that the results can be used as an input and part of the row-store component query.

In some embodiments, query pipelining module 715 is utilized by query engine 701 to execute the component queries in a pipelined manner. For example, query pipelining module 715 can manage the timing and staging of the execution of different component queries to different database services. In some embodiments, query pipelining module 715 ensures during the execution of component queries, the output of a first query stage is correctly used as the input to a second query stage. In some embodiments, query pipelining module 715 is further utilized to partition a query into batches. For example, a query that covers a large range can be partitioned by query pipelining module 715 into smaller sub-ranges and executed as multiple batches. In some embodiments, query pipelining module 715 also processes batch execution results, for example, to merge the different results into a single query response for a database client of the database instance.

In some embodiments, data synchronization module 717 is utilized by query engine 701 to maintain data consistency between synchronized records of the different database services. For example, data synchronization module 717 can maintain and track updates to the database records of the different database services. When an update to a synchronized data record is identified, data synchronization module 717 ensures that the update is applied to all corresponding data records of different database services.

In some embodiments, query analytics module 719 is utilized by query engine 701 to track analytics related to the analysis and splitting of database queries. For example, query analytics module 719 can be used to track the execution performance of a query or component query by different database services. In some embodiments, query analytics module 719 is used to maintain and track historical performance data including resource load, memory usage, response time, and/or other metrics of a database instance. In various embodiments, query analytics module 719 can be used to generate analytics for predicting trends related to query requests and/or to predict the execution characteristics of a requested query.

In some embodiments, audit engine 721 is utilized by the various components of query engine 701 for auditing the execution of database queries including component queries. For example, audit engine 721 can be used to log the analysis of a database query and associated query split parameters. Similarly, audit engine 721 can be used to log the splitting of a query into component queries and the context of the execution of the component queries, including the performance of executing each component query. In some embodiments, the data of audit engine 721 is stored locally and/or provided to an external cloud-based application service such as an application service running on application server 121 of FIG. 1.

In some embodiments, interface 751 is used by query engine 701 to communicate with the different components of the database instance. For example, interface 751 can be used to receive a database query, route database component queries to different database services, and receive results from executing database queries. In some embodiments, interface 751 is implemented using a network connection, a local connection, an application interface, message passing, and/or other communication mechanisms to allow query engine 701 to interface with other components of the database instance.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a database query;
   determining whether the database query is to be processed by a first database, a second database, or at least in part processed by both the first database and the second database including by determining whether the database query meets criteria to split the database query for processing across the first database and the second database, wherein the first database and the second database store shared synchronized records, the first database is configured to store the synchronized records in a column oriented format, and the second database is configured to store the synchronized records in a row oriented format;
   determining that that the database query meets the criteria to split the database query including by determining based at least in part on historical performance data that there exists a performance improvement to split the database query and use both the first database and the second database as compared to processing the database query without splitting the database query, wherein the historical performance data is based on auditing an execution of a previous database query by logging a split of the previous database query into component queries and a performance of executing the component queries of the previous database query;
   in response to the determination that the database query meets the criteria to split the database query, generating a first component query of the database query for the first database and a second component query of the database query for the second database, wherein the generation of the second component query is based at least in part on a result of the first component query and wherein the result of the first component query including a result of a column-store component query generated from a WHERE clause or a JOIN clause of the database query is used to generate the second component query including a row-store component query generated from a SELECT clause of the database query; and
   pipelining execution of the first component query and the second component query.

2. The method of claim 1, wherein determining whether the database query meets the criteria to split the database query for processing across the first database and the second database includes determining a number of projections of the database query and determining whether the determined number of projections of the database query exceeds a configured projections threshold value.

3. The method of claim 1, wherein determining whether the database query meets the criteria to split the database query for processing across the first database and the second database includes determining a number of aggregate functions of the database query and determining whether the determined number of aggregate functions of the database query exceeds a configured aggregate functions threshold value.

4. The method of claim 1, wherein determining whether the database query meets the criteria to split the database query for processing across the first database and the second database includes determining a number of tables referenced by a JOIN operation of the database query and determining whether the determined number of the tables referenced by the JOIN operation exceeds a configured JOIN operation threshold value.

5. The method of claim 1, wherein determining whether the database query meets the criteria to split the database query for processing across the first database and the second database includes determining whether a number of projections of the database query exceeds a configured projections threshold value and whether a number of aggregate functions of the database query exceeds a configured aggregate functions threshold value.

6. The method of claim 1, wherein determining whether the database query meets the criteria to split the database query for processing across the first database and the second database includes determining whether a number of projections of the database query exceeds a configured projections threshold value and whether a number of tables referenced by a JOIN operation of the database query exceeds a configured JOIN operation threshold value.

7. The method of claim 1, wherein generating the first component query of the database query for the first database includes translating the first component query to a first database query language of the first database from a second database query language of the second database, wherein the first database query language and the second database query language are different.

8. The method of claim 1, wherein determining whether the database query meets the criteria to split the database query for processing across the first database and the second database includes creating a query tree of the database query and identifying a first node of the query tree corresponding to the first component query and a second node of the query tree corresponding to the second component query.

9. The method of claim 8, wherein the first node of the query tree corresponds to a sub-tree of the query tree and the second node of the query tree corresponds to a root node of the query tree.

10. A system, comprising:
one or more processors; and
a memory coupled to the one or more processors, wherein the memory is configured to provide the one or more processors with instructions which when executed cause the one or more processors to:
receive a database query;
determine whether the database query is to be processed by a first database, a second database, or at least in part processed by both the first database and the second database including by determining whether the database query meets criteria to split the database query for processing across the first database and the second database, wherein the first database and the second database store shared synchronized records, the first database is configured to store the synchronized records in a column oriented format, and the second database is configured to store the synchronized records in a row oriented format;
determine that that the database query meets the criteria to split the database query including by being configured to determine based at least in part on historical performance data that there exists a performance improvement to split the database query and use both the first database and the second database as compared to processing the database query without splitting the database query, wherein the historical performance data is based on auditing an execution of a previous database query by logging a split of the previous database query into component queries and a performance of executing the component queries of the previous database query;
in response to the determination that the database query meets the criteria to split the database query, generate a first component query of the database query for the first database and a second component query of the database query for the second database, wherein the generation of the second component query is based at least in part on a result of the first component query and wherein the result of the first component query including a result of a column-store component query generated from a WHERE clause or a JOIN clause of the database query is used to generate the second component query including a row-store component query generated from a SELECT clause of the database query; and
pipeline execution of the first component query and the second component query.

11. The system of claim 10, wherein determining whether the database query meets the criteria to split the database query for processing across the first database and the second database includes determining a number of projections of the database query and determining whether the determined number of projections of the database query exceeds a configured projections threshold value.

12. The system of claim 10, wherein determining whether the database query meets the criteria to split the database query for processing across the first database and the second database includes determining a number of aggregate functions of the database query and determining whether the determined number of aggregate functions of the database query exceeds a configured aggregate functions threshold value.

13. The system of claim 10, wherein determining whether the database query meets the criteria to split the database query for processing across the first database and the second database includes determining a number of tables referenced by a JOIN operation of the database query and determining whether the determined number of the tables referenced by the JOIN operation exceeds a configured JOIN operation threshold value.

14. The system of claim 10, wherein determining whether the database query meets the criteria to split the database query for processing across the first database and the second database includes determining whether a number of projections of the database query exceeds a configured projections threshold value and whether a number of aggregate functions of the database query exceeds a configured aggregate functions threshold value.

15. The system of claim 10, wherein determining whether the database query meets the criteria to split the database query for processing across the first database and the second database includes determining whether a number of projections of the database query exceeds a configured projections threshold value and whether a number of tables referenced by a JOIN operation of the database query exceeds a configured JOIN operation threshold value.

16. The system of claim 10, wherein generating the first component query of the database query for the first database includes translating the first component query to a first database query language of the first database from a second database query language of the second database, wherein the first database query language and the second database query language are different.

17. The system of claim 10, wherein determining whether the database query meets the criteria to split the database query for processing across the first database and the second database includes creating a query tree of the database query and identifying a first node of the query tree corresponding to the first component query and a second node of the query tree corresponding to the second component query, and wherein the first node of the query tree corresponds to a sub-tree of the query tree and the second node of the query tree corresponds to a root node of the query tree.

18. A computer program product, the computer program product being embodied in a non-transitory computer readable storage medium and comprising computer instructions for:
- receiving a database query;
- determining whether the database query is to be processed by a first database, a second database, or at least in part processed by both the first database and the second database including by determining whether the database query meets criteria to split the database query for processing across the first database and the second database, wherein the first database and the second database store shared synchronized records, the first database is configured to store the synchronized records in a column oriented format, and the second database is configured to store the synchronized records in a row oriented format;
- determining that that the database query meets the criteria to split the database query including by determining based at least in part on historical performance data that there exists a performance improvement to split the database query and use both the first database and the second database as compared to processing the database query without splitting the database query, wherein the historical performance data is based on auditing an execution of a previous database query by logging a split of the previous database query into component queries and a performance of executing the component queries of the previous database query;
- in response to the determination that the database query meets the criteria to split the database query, generating a first component query of the database query for the first database and a second component query of the database query for the second database, wherein the generation of the second component query is based at least in part on a result of the first component query and wherein the result of the first component query including a result of a column-store component query generated from a WHERE clause or a JOIN clause of the database query is used to generate the second component query including a row-store component query generated from a SELECT clause of the database query; and
- pipelining execution of the first component query and the second component query.

19. The computer program product of claim 18, wherein the first node of the query tree corresponds to a sub-tree of the query tree and the second node of the query tree corresponds to a root node of the query tree.

20. The computer program product of claim 18, wherein determining whether the database query meets the criteria to split the database query for processing across the first database and the second database includes determining a number of projections of the database query and determining whether the determined number of projections of the database query exceeds a configured projections threshold value.

* * * * *